(12) United States Patent
Shigeta et al.

(10) Patent No.: US 11,088,370 B2
(45) Date of Patent: Aug. 10, 2021

(54) GAS DIFFUSION ELECTRODE AND FUEL CELL

(71) Applicant: Toray Industries, Inc., Tokyo (JP)

(72) Inventors: Kazuyo Shigeta, Otsu (JP); Junichi Urai, Otsu (JP); Yasutaka Okano, Otsu (JP)

(73) Assignee: Toray Industries, Inc.

( * ) Notice: Subject to any disclaimer, the term of this patent is extended or adjusted under 35 U.S.C. 154(b) by 265 days.

(21) Appl. No.: 16/333,768

(22) PCT Filed: Sep. 15, 2017

(86) PCT No.: PCT/JP2017/033508
§ 371 (c)(1),
(2) Date: Mar. 15, 2019

(87) PCT Pub. No.: WO2018/061833
PCT Pub. Date: Apr. 5, 2018

(65) Prior Publication Data
US 2019/0214651 A1    Jul. 11, 2019

(30) Foreign Application Priority Data

Sep. 29, 2016 (JP) .............................. JP2016-190979

(51) Int. Cl.
*H01M 4/86* (2006.01)
*H01M 8/0234* (2016.01)
(Continued)

(52) U.S. Cl.
CPC ......... *H01M 4/8626* (2013.01); *H01M 4/861* (2013.01); *H01M 4/8605* (2013.01);
(Continued)

(58) Field of Classification Search
CPC .. H01M 4/8605; H01M 4/861; H01M 4/8621; H01M 4/8626; H01M 4/8807;
(Continued)

(56) References Cited

U.S. PATENT DOCUMENTS 6,376,118 B1    4/2002   Brück et al.
6,579,639 B1    6/2003   Gyoten et al.
(Continued)

FOREIGN PATENT DOCUMENTS

CA    2965604 A1    5/2016
CN    1877890 A     12/2006
(Continued)

OTHER PUBLICATIONS

International Search Report and Written Opinion for International Application No. PCT/JP2017/033508, dated Dec. 12, 2017—6 pages.
(Continued)

*Primary Examiner* — Adam A Arciero
(74) *Attorney, Agent, or Firm* — RatnerPrestia

(57) ABSTRACT

A gas diffusion electrode including: a conductive porous substrate and a microporous layer on at least one side of the conductive porous substrate; in which the total of regions passing through the microporous layer in the thickness direction has an area ratio of 0.1% or more and 1% or less; and in which the microporous layer has a portion that has penetrated into the conductive porous substrate (hereinafter referred to as penetration portion), the penetration portion having a thickness ratio of 30% or more and 70% or less with respect to 100% of the thickness of the microporous layer. The gas diffusion electrode used for fuel cells affords fuel cells having high water removal performance and high power generation performance.

5 Claims, 1 Drawing Sheet

(51) Int. Cl.
*H01M 8/0245* (2016.01)
*H01M 4/88* (2006.01)
*H01M 8/04119* (2016.01)
*H01M 8/1004* (2016.01)

(52) U.S. Cl.
CPC ....... *H01M 4/8621* (2013.01); *H01M 4/8807* (2013.01); *H01M 8/0234* (2013.01); *H01M 8/0245* (2013.01); *H01M 8/04149* (2013.01); *H01M 8/1004* (2013.01)

(58) Field of Classification Search
CPC ............ H01M 8/0234; H01M 8/0245; H01M 8/04149; H01M 8/1004
See application file for complete search history.

(56) References Cited

U.S. PATENT DOCUMENTS

| | | | |
|---|---|---|---|
| 9,608,281 | B2 | 3/2017 | Imaizumi et al. |
| 9,972,847 | B2 | 5/2018 | Utsunomiya et al. |
| 2002/0098407 | A1 | 7/2002 | Kunisa et al. |
| 2006/0046926 | A1* | 3/2006 | Ji .................. H01M 4/8605 502/101 |
| 2006/0257641 | A1 | 11/2006 | Cho et al. |
| 2010/0028750 | A1* | 2/2010 | Ji .................. H01M 8/0243 429/465 |
| 2012/0196205 | A1 | 8/2012 | Park et al. |
| 2016/0365582 | A1 | 12/2016 | Kato et al. |
| 2017/0012291 | A1 | 1/2017 | Tanimura et al. |
| 2017/0317357 | A1 | 11/2017 | Utsunomiya et al. |

FOREIGN PATENT DOCUMENTS

| | | |
|---|---|---|
| CN | 104584292 A | 4/2015 |
| JP | 2001057217 A | 2/2001 |
| JP | 2008293937 A | 12/2008 |
| JP | 2012054111 A | 3/2012 |
| JP | 2013139550 A | 7/2013 |
| JP | 2015015226 A | 1/2015 |
| JP | 2015195111 A | 11/2015 |
| JP | 2016006799 A | 1/2016 |
| JP | 2016012558 A | 1/2016 |
| WO | 0122510 A1 | 3/2001 |
| WO | 2015125748 A1 | 8/2015 |
| WO | 2016076132 A1 | 5/2016 |

OTHER PUBLICATIONS

Chinese Office Action for Chinese Application No. 201780038818.4, dated Jan. 22, 2021, with translation, 11 pages.

* cited by examiner

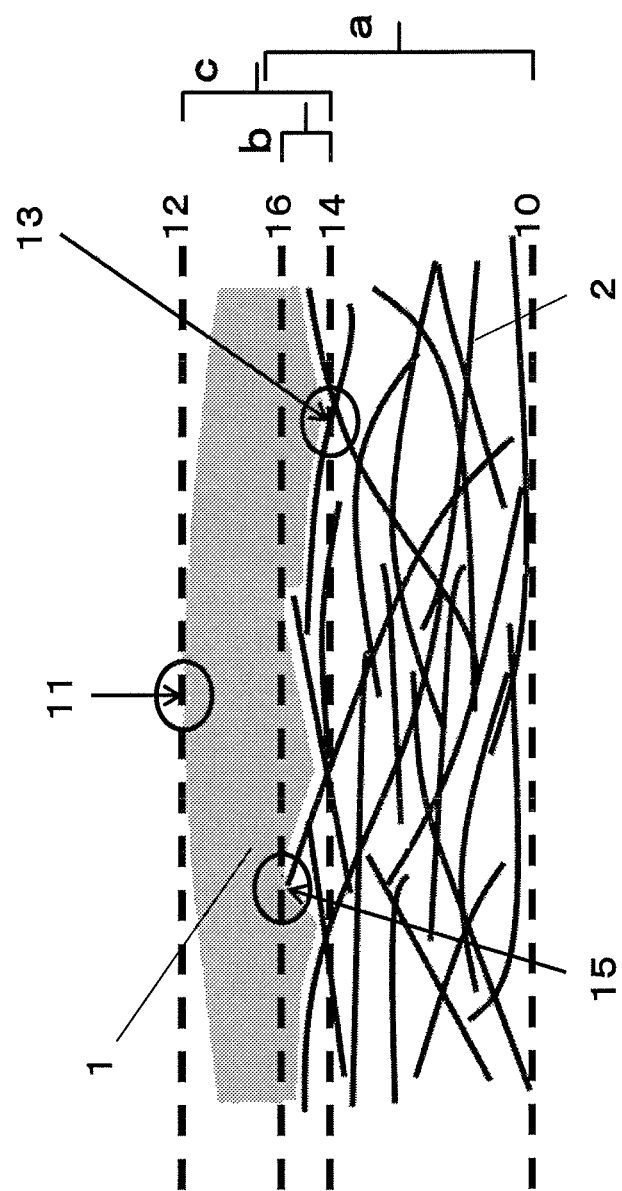

GAS DIFFUSION ELECTRODE AND FUEL CELL

CROSS REFERENCE TO RELATED APPLICATIONS

This is the U.S. National Phase application of PCT/JP2017/033508, filed Sep. 15, 2017, which claims priority to Japanese Patent Application No. 2016-190979, filed Sep. 29, 2016, the disclosures of these applications being incorporated herein by reference in their entireties for all purposes.

FIELD OF THE INVENTION

A fuel cell is a mechanism by which energy generated by reaction between hydrogen and oxygen to produce water is electrically extracted. Since fuel cells have high energy efficiency and emit only water, they are expected to become more popular as clean energy. The present invention relates to a gas diffusion electrode for use in a fuel cell. Among fuel cells, the invention particularly relates to a gas diffusion electrode suitable for a polymer electrolyte fuel cell, which is used as a power supply for fuel cell vehicles, etc.

BACKGROUND OF THE INVENTION

Electrodes for use in a polymer electrolyte fuel cell are sandwiched between two bipolar plates in a polymer electrolyte fuel cell. Such an electrode is configured to have, on each side of a polymer electrolyte membrane, a catalyst layer formed on the surface of the polymer electrolyte membrane and a gas diffusion layer formed on the outer side of the catalyst layer. As separate members for forming gas diffusion layers of electrodes, gas diffusion electrodes have been distributed. Such gas diffusion electrodes require properties such as gas diffusivity, electrical conductivity for collecting the electricity generated in the catalyst layer, and water removal performance for efficiently removing water generated on the catalyst layer surface. In order to obtain such a gas diffusion electrode, generally, a conductive porous substrate having both gas diffusivity and electrical conductivity is used.

As a conductive porous substrate, specifically, a carbon felt, a carbon paper, a carbon cloth, or the like made of carbon fiber is used. In particular, carbon papers are believed to be the most preferable in the light of mechanical strength and the like.

Since a fuel cell is a system for electrically extracting the energy generated upon production of water by reaction between hydrogen and oxygen, an increase in the electric load, that is, an increase in the current to be extracted to the outside of the cell, causes production of a large amount of water (water vapor). At a low temperature, such water vapor is condensed into water drops, blocking pores of the gas diffusion electrode. As a result, the amount of gas (oxygen or hydrogen) supplied to the catalyst layer decreases, and when all the pores are blocked eventually, power generation ceases (this phenomenon is called "flooding").

In order to prevent the occurrence of flooding as much as possible, a gas diffusion electrode is required to have water removal performance. As a means for enhancing the water removal performance, usually, a gas diffusion electrode substrate including a conductive porous substrate that has been subjected to water-repellent treatment is used to increase water repellency.

In addition, when the water-repellent-treated conductive porous substrate as described above is directly used as a gas diffusion electrode, because its fiber mesh is coarse, large water drops are produced as a result of the condensation of water vapor. This easily leads to flooding. Therefore, in some cases, an ink having dispersed therein electrically conductive microparticles such as carbon black is applied to a water-repellent-treated conductive porous substrate, and the ink is then dried and sintered to provide a layer called microporous layer (which is also referred to as microporous layer).

Patent Literature

There is a known gas diffusion electrode that has less defects such as cracks on the surface of its microporous layer and hence is more durable and less subject to flooding (Patent Document 1).

In addition, Patent Document 2 discloses that it provides a gas diffusion electrode with the microporous layer of which is provided with fine cracks on purpose and thus which prevents the microporous layer from experiencing a structural change before and after winding and can be wound into a roll form.

Furthermore, Patent Document 3 discloses a gas diffusion electrode for which a film having porous communicating spaces is used in order to afford good gas diffusivity and surface smoothness and which has strong resistance to bending and excellent handling properties, neither of which can be achieved by a carbon fiber sheet.

Patent Document 4 describes achievement of excellent gas permeability and gas diffusivity that are imparted under control of crack formation.

Patent Document 1: JP 2016-6799 A
Patent Document 2: JP 2016-12558 A
Patent Document 3: JP 2013-139550 A
Patent Document 4: JP 2012-54111 A

SUMMARY OF THE INVENTION

However, the gas diffusion electrode described in Patent Document 1 does not involve consideration for the phenomenon in which the microporous layer penetrates into the conductive porous substrate, and thus the gas diffusion electrode may have insufficient water removal performance and give insufficient power generation performance to the fuel cell.

Patent Document 2 describes the gas diffusion electrode as having 25 to 1,000 cracks/m$^2$, in other words, having the cracks that account for about 0.001% of the area of the gas diffusion electrode, whose water removal performance is accordingly insufficient, and the object is to prevent a structural change before and after winding, and hence is different from an object of the present invention.

In addition, the gas diffusion electrode in Patent Document 3 relates to an electrically conductive film having bent communicating spaces, has no concept of penetration, and has insufficient water removal performance.

The gas diffusion electrode described in Patent Document 4 is such that the substrate is coated with a material containing a large amount of water-repellent agent so that the microporous layer can substantially not penetrate the substrate, and the electrical conductivity and thermal conductivity of the gas diffusion electrode are insufficient, In view of this, an object of the present invention is to provide a gas diffusion electrode having enhanced water removal performance and high durability and having enhanced power generation performance when used for fuel cells.

In order to solve the above problems, the gas diffusion electrode according to the present invention has the following structure: that is, a gas diffusion electrode including: a conductive porous substrate, and a microporous layer on at least one side of the conductive porous substrate;

in which the total of regions passing through the microporous layer in the thickness direction has an area ratio of 0.1% or more and 1% or less, and in which the microporous layer has a portion that has penetrated into the conductive porous substrate (hereinafter referred to as penetration portion), the penetration portion having a thickness ratio (hereinafter referred to as penetration amount) of 30% or more and 70% or less with respect to 100% of the thickness of the microporous layer.

In order to solve the above problems, the fuel cell according to the present invention has the following structure: that is, a fuel cell having the gas diffusion electrode.

The gas diffusion electrode according to the present invention is preferably such that the number of the regions passing through the microporous layer in the thickness direction is 0.4 or more and 7.0 or less per mm$^2$ area of the gas diffusion electrode.

The gas diffusion electrode according to the present invention is preferably such that the microporous layer includes a non-penetration portion that is the portion other than the penetration portion, in which the non-penetration portion has a fluorine intensity of 5 or more and 20 or less, assuming that the non-penetration portion has a carbon intensity of 100.

The gas diffusion electrode according to the present invention is preferably such that the conductive porous substrate has a density of 0.15 g/cm$^3$ or more and 0.5 g/cm$^3$ or less.

The gas diffusion electrode according to the present invention is preferably such that the microporous layer has a thickness of 100 μm or less.

When used for fuel cells, the gas diffusion electrode according to the present invention affords fuel cells having high gas diffusivity, water removal performance, power generation performance, and durability.

BRIEF DESCRIPTION OF DRAWINGS

The FIGURE is a schematic cross-sectional view of the gas diffusion electrode according to the present invention.

DETAILED DESCRIPTION OF EMBODIMENTS OF THE INVENTION

The present invention is a gas diffusion electrode including: a conductive porous substrate and a microporous layer on at least one side of the conductive porous substrate; in which the total of regions passing through the microporous layer in the thickness direction has an area ratio of 0.1% or more and 1% or less.

Specifically, as the conductive porous substrate used in the gas diffusion electrode according to the present invention, for example, it is preferable to use a carbon-fiber-containing porous substrate such as a carbon fiber woven fabric, carbon fiber papermaking substrate, carbon fiber non-woven fabric, carbon felt, carbon paper, or carbon cloth, or a metal porous substrate such as a sinter-foamed metal, metal mesh, or an expanded metal. Among them, in the light of excellent corrosion resistance, it is preferable to use a carbon-fiber-containing porous substrate such as a carbon felt, carbon paper, or carbon cloth. Further, in the light of the excellent "spring property", that is, the property of absorbing dimensional changes in the thickness direction of an electrolyte membrane, it is preferable to use a carbonized-resin-containing substrate obtained by bonding a carbon fiber papermaking substrate using a carbide, that is, to use a carbon paper.

The present invention includes a microporous layer on at least one side of the conductive porous substrate. The microporous layer is a layer containing electrically conductive microparticles made of carbon black, carbon nanotube, carbon nanofiber, chopped carbon fiber, graphene, graphite, and the like.

Among the electrically conductive microparticles, carbon black is suitably used in the light of low cost, safety, and stability of product quality. Acetylene black is suitably used since it contains fewer impurities, and is therefore less likely to reduce the activity of a catalyst. An example of the standard for the impurity content of the carbon black is the ash content. It is preferred to use a carbon black whose ash content is 0.1% by mass or less. The lower the ash content in the carbon black, the more preferred. A carbon black whose ash content is 0% by mass, that is, a carbon black free from ash, is especially preferred.

In addition, the microporous layer is required to have properties such as electrical conductivity, gas diffusivity, water removal performance, water vapor retention, and thermal conductivity, as well as strong acid resistance in the anode side and oxidation resistance in the cathode side inside a fuel cell. Therefore, the microporous layer preferably contains a water-repellent resin, for example, a fluorine resin, in addition to the electrically conductive microparticles. Examples of the fluorine resin contained in the microporous layer include PTFE, FEP, PFA, and ETFA, similarly to the fluorine resin suitably used for the water-repellent treatment of the conductive porous substrate. In the light of particularly high water repellency, PTFE or FEP is preferable.

The microporous layer of the gas diffusion electrode according to the present invention has regions passing through the microporous layer in the thickness direction. The regions that pass through the microporous layer in the thickness direction may be holes, cracks (fissures or slits), mixtures of holes and cracks, or the like. The regions passing through the microporous layer in the thickness direction allow light to be transmitted through the regions from the conductive porous substrate side to the microporous layer side. This makes it possible that whether there is any region passing through the microporous layer in the thickness direction can be determined on the basis of whether there is any light detected at the microporous layer side when the light is applied to the conductive porous substrate side.

In the gas diffusion electrode according to the present invention, the total of regions passing through the microporous layer in the thickness direction has an area ratio of 0.1% or more and 1% or less. The area ratio of less than 0.1% means that the number of holes or cracks is small, and the water removal performance may be insufficient. More than 1% as an area ratio of the total of regions passing through the microporous layer in the thickness direction means that the number of holes or cracks is large, and repetition of power generation operations results in causing the electrolyte membrane to be deformed along the roughness of the microporous layer or causing carbon fibers to be protruded out of the conductive porous substrate, thereby causing holes or breaks to occur in the electrolyte membrane, and posing the possibility that the durability of the fuel cell may be reduced.

In the present invention, the microporous layer has a portion that has penetrated into the conductive porous substrate, and the portion is hereinafter referred to as a penetration portion. In addition, the ratio in thickness of the penetration portion with respect to the thickness of the microporous layer as 100% is hereinafter referred to as a penetration amount, and in the present invention, the penetration amount is preferably 30% or more and 70% or less. This is because the penetration amount of 30% or more and 70% or less allows the area ratio of the total of regions passing through the microporous layer in the thickness direction to be controlled to 0.1% or more and 1% or less.

In this regard, examples of methods of obtaining the penetration amount of 30% or more and 70% or less include a method in which to control the water-repellent resin content with respect to 100% by mass of the microporous layer, and the content is preferably 7% or more and 20% or less. The content is more preferably 9% or more and 17% or less. The water-repellent resin content in this range allows the gas diffusion electrode to have excellent water removal performance, enables the power generation performance of the fuel cell to be prevented from lowering, at the same time prevents the regions passing through the microporous layer from being excessive, and thus allows the fuel cell to have excellent durability.

Methods of measuring the penetration portion and the penetration amount will be described later.

The penetration amount in the above-mentioned range causes gas diffusion resistance in the microporous layer less easily, enables the power generation performance of the fuel cell to be prevented from lowering, at the same time facilitates the diffusion of gas and water within the conductive porous substrate, and thus enables the power generation performance of the fuel cell to be prevented from lowering. The penetration amount is more preferably 30% or more and 55% or less. This range makes it possible to maintain low electrical resistance and also achieve high gas diffusivity and high water removal performance.

The gas diffusion electrode according to the present invention preferably has 0.4 or more and 7.0 or less regions passing through the microporous layer in the thickness direction per $mm^2$ area of the gas diffusion electrode. Having 0.4 or more and 7.0 or less regions allows the gas diffusion electrode to have sufficient and uniform water removal performance, and thus causes no flooding and can enhance the power generation performance of the fuel cell.

In addition, a non-penetration portion, which is the portion of the microporous layer other than the penetration portion, preferably has a fluorine intensity of 5 or more and 20 or less, assuming that the non-penetration portion has a carbon intensity of 100. The non-penetration portion having a fluorine intensity in the above-described preferable range means a suitable fluorine amount, affords excellent water removal performance, at the same time allows the regions passing through the microporous layer in the thickness direction to be suitable, and thus enables the fuel cell to have excellent durability.

In the present invention, the microporous layer preferably has a thickness of 100 μm or less, considering the roughness of current conductive porous substrates. The microporous layer having a thickness in the above-described preferable range allows the gas diffusion electrode itself to have excellent diffusivity of gas and water (permeability and water removal performance) and be less likely to have high electrical resistance. The microporous layer has a thickness of more preferably 80 μm or less, still more preferably 40 μm or less, from the viewpoint of increasing permeability and water removal performance or reducing electrical resistance, and the lower limit is preferably 15 μm or more in order to cover the roughness of the conductive porous substrate.

In addition, the conductive porous substrate preferably has a density of 0.15 $g/cm^3$ or more and 0.5 $g/cm^3$ or less. The conductive porous substrate having a density in the preferable range allows the conductive porous substrate to have sufficient intensity and excellent durability, and at the same time to prevent water removal performance and gas permeability from reducing.

The thickness of the gas diffusion electrode or the conductive porous substrate is determined by a method in which an ion milling apparatus such as IM4000, manufactured by Hitachi High-Technologies Corporation, is used to cut the gas diffusion electrode in the thickness direction, and the perpendicular cross-section (cross-section in the thickness direction) is observed with an SEM, followed by calculating the thickness on the basis of the image observed. The thickness of the microporous layer can be determined by subtracting the thickness of the conductive porous substrate from the thickness of the gas diffusion electrode.

In addition, the maximum surface roughness (Rz) of the microporous layer is preferably 40 μm or more and 80 μm or less. The microporous layer having the maximum surface roughness (Rz) in the above-described preferable range allows the water removal performance to be suitable even on the surface having fewer cracks, at the same time causes no coarse roughness, thus is less likely to deform the electrolyte membrane along the roughness of the microporous layer, generates no hole nor break, and enables the fuel cell to have excellent durability.

A preferable method of forming a microporous layer on at least one side of the conductive porous substrate is a method in which an ink for forming a microporous layer (hereinafter referred to as a microporous layer ink) is applied by screen printing, rotary screen printing, spraying, intaglio printing, gravure printing, die coating, bar coating, blade coating, knife coating, and the like. The concentration of electrically conductive microparticles in the microporous layer ink is preferably 5% by weight or more, more preferably 10% by mass or more, from a productivity viewpoint. There is no upper limit to the concentration as long as the viscosity, the dispersion stability of the electrically conductive particles, the coating properties of the ink, and the like are suitable, but the microporous layer ink having an excessive concentration of electrically conductive microparticles may impair the ink suitability. Applying the microporous layer ink is generally followed by sintering at 250° C. or more and 400° C. or less.

In the present invention, the thickness of a conductive porous substrate such as carbon paper is preferably smaller, from the viewpoint of enhancing the gas diffusivity. In other words, the conductive porous substrate such as carbon paper has a thickness of preferably 220 μm or less, more preferably 150 μm or less, particularly preferably 120 μm or less. The conductive porous substrate having a thickness in the above-described preferable range has sufficient mechanical strength and is easy to handle in production processes. The lower limit of the thickness of the conductive porous substrate is usually 70 μm.

As the conductive porous substrate used for the gas diffusion electrode according to the present invention, one subjected to water-repellent treatment by application of a fluorine resin is suitably used. Since a fluorine resin acts as a water-repellent resin, the conductive porous substrate according to the present invention preferably contains a water-repellent resin such as a fluorine resin. Examples of the water-repellent resin contained in the conductive porous substrate, that is, the fluorine resin contained in the conductive porous substrate, include PTFE (polytetrafluoroethylene) (e.g., "Teflon" (registered trademark)), FEP (tetrafluoroethylene-hexafluoropropylene copolymer), PFA (perfluoroalkoxy fluoride resin), ETFA (ethylene-tetrafluoroethylene copolymer), PVDF (polyvinylidene fluoride), and PVF (polyvinyl fluoride). PTFE, which shows strong water repellency, or FEP is preferred.

The amount of the water-repellent resin is not limited to a particular value, and is suitably about 0.1% by mass or more and 20% by mass or less with respect to the whole conductive porous substrate as 100% by mass. The amount of the water-repellent resin in the above-described preferable range allows the water repellency to be sufficiently produced, and at the same time makes it less likely that the pores serving as the gas diffusion path or the water removal path are blocked and that the electrical resistance is increased.

As a method of water-repellent treatment of the conductive porous substrate, a treatment technique by dipping the conductive porous substrate in a dispersion containing a generally known water-repellent resin, as well as a coating technique by applying a water-repellent resin to the conductive porous substrate by die coating, spray coating, or the like may be applied. Processing by a dry process such as sputtering of a fluorine resin may also be applied. After the water-repellent treatment, a drying step and/or a sintering step may be added, as needed.

The fuel cell according to the present invention is characterized by including the gas diffusion electrode according to the present invention. Because the fuel cell according to the present invention includes the gas diffusion electrode according to the present invention, the fuel cell is characterized by having high power generation performance.

EXAMPLES

Below, the present invention will be described specifically with reference to Examples. The materials, methods of preparing a gas diffusion electrode, and methods of evaluating the power generation performance of a fuel cell used in the Examples were as follows:

Example 1

<Materials>
A. Conductive Porous Substrate
Polyacrylonitrile-based carbon fiber, "TORAYCA" (registered trademark) T300 (average diameter: 7 μm), made by Toray Industries, Inc., was cut into short fibers having an average length of 12 mm, dispersed in water, and continuously made into paper form using a wet papermaking method. Further, the formed paper was coated with a 10% by mass polyvinyl alcohol aqueous solution as a binder and dried to prepare a carbon fiber sheet having a carbon fiber areal weight of 26 g/m². Per 100 parts by mass of the carbon fiber, the amount of polyvinyl alcohol attached was equivalent to 18 parts by mass.

Next, a resol-type phenolic resin and a novolac-type phenolic resin were mixed so as to obtain a phenol resin having the non-volatile portions at a mass ratio of 1:1, and this phenol resin as a thermosetting resin, a flake graphite powder (having an average particle size of 5 μm) as a carbon powder, and methanol as a solvent were mixed at a blending ratio of 10 parts by mass/5 parts by mass/85 parts by mass as the thermosetting resin (non-volatile portions)/carbon powder/solvent, to obtain a resin composition (liquid mixture) with the these materials uniformly dispersed therein.

Next, the carbon fiber sheet was continuously dipped in the resin composition liquid mixture and sandwiched/drawn between rolls, in a resin impregnation step, and then wound up in a roll form to obtain a pre-impregnated carbon fiber sheet. In this regard, the rolls were smooth metal rolls having a structure that allows an extra amount of the resin composition to be removed using a doctor blade, and the carbon fiber sheet was pulled up vertically between two such rolls disposed horizontally with a given clearance therebetween, whereby the whole amount of the attached resin composition was adjusted. The amount of the phenol resin attached in the pre-impregnated carbon fiber sheet was 130 parts by mass with respect to 100 parts by mass of the carbon fibers.

In a pressing machine, hot plates were set in parallel with each other, a spacer was disposed on the lower hot plate, and the resin impregnated carbon fiber paper sandwiched between the upper and the lower release paper was intermittently conveyed between the hot plates to thereby carry out a compression treatment. In this step, the spacing between the upper and the lower pressing face plates was adjusted such that the pre-impregnated carbon fiber sheet would have a desired thickness after the pressing treatment.

In addition, hot-pressing, opening the press, and sending the carbon fiber were repeated to perform the compression treatment, and then the paper was wound up in a roll form. A measurement of the thickness of the pre-impregnated carbon fiber sheet at 0.15 MPa after the pressing treatment in the compression step was 165

The pressing-treated pre-impregnated carbon fiber sheet was introduced into a heating oven in which a temperature of 2,400° C. or less was maintained in a nitrogen gas atmosphere, allowed to undergo a carbonization step in which the pre-impregnated carbon fiber sheet was continuously run and fired through the heating oven, and then wound up in a roll form, to obtain a conductive porous substrate. The obtained conductive porous substrate had a thickness of 140 μm at 0.15 MPa.

B. Microporous Layer
Carbon black, a water-repellent resin ("Neoflon" (registered trademark) FEP dispersion ND-110 (FEP resin made by Daikin Industries, Ltd.)), a surfactant ("TRITON" (registered trademark) X-100 (made by Nacalai Tesque, Inc.)), and water were used.

<Evaluation>
A. Method of Measuring Penetration Amount
First, an ion milling apparatus (IM4000, manufactured by Hitachi High-Technologies Corporation) was used to cut out a perpendicular cross-section (cross-section in the thickness direction), an image of which was observed using a scanning electron microscope (SEM, S-4800, manufactured by Hitachi, Ltd.) at a magnification ratio of 200×.

Next, a method of determining the boundary between the microporous layer and the conductive porous substrate will be described with reference to the FIGURE. A point (11) on the outermost surface of the microporous layer was used as a starting point to draw a line parallel with the outermost surface (10) of the conductive porous substrate, and the line was regarded as the outermost surface (12) of the microporous layer. In the portion of the microporous layer that penetrated into the conductive porous substrate (penetration portion), a point (13) was where the penetration portion was nearest the outermost surface of the conductive porous substrate, this point (13) was used as a starting point to draw a line parallel with the outermost surface (10) of the conductive porous substrate, and the line was regarded as the innermost face (14) of the microporous layer. In the microporous layer side outermost face of the conductive porous substrate, a point (15) is nearest the outermost surface of the microporous layer, the point (15) was used as a starting point to draw a line in parallel with the outermost surface (10) of the conductive porous substrate, and the line was regarded as the innermost face (16) of the conductive porous substrate.

The distance between the outermost surface (10) of the conductive porous substrate and the innermost face (16) of the conductive porous substrate was regarded as the thickness (a) of the conductive porous substrate, the distance between the innermost face (14) of the microporous layer and the innermost face (16) of the conductive porous substrate as the thickness (b) of the penetration portion, and the distance between the outermost surface (12) of the microporous layer and the innermost face (14) of the microporous layer as the thickness (c) of the microporous layer.

In addition, the penetration amount was determined from the equation: Thickness (b) of Penetration Portion/Thickness (c) of Microporous Layer×100. Three penetration points of the microporous layer were defined from three points on the image, and the penetration amount was determined to be the average of the three values.

B. Method of Measuring Area Ratio of Total of Regions Passing Through Microporous Layer in Thickness Direction In determining the area of regions passing through the microporous layer in the thickness direction, the microporous layer side of the gas diffusion electrode was observed under an optical microscope, and the conductive porous substrate side was irradiated with light so that the regions passing through the microporous layer in the thickness direction were made to shine and be photographed as an image. Then, the photographed image was taken in an image processing software (JTrim), and the integration of the numbers of pixels having a brightness level of 240 or more, in other words, the integration of the numbers of pixels of the white regions, in which the integration was regarded as the passing-through regions, was divided by the number of the whole pixels to determine an area ratio (%) of the total of the regions passing through the microporous layer in the thickness direction.

C. Number of Regions Passing Through Microporous Layer in Thickness Direction Per $mm^2$ Area of Gas Diffusion Electrode As described in B, in determining the number of regions passing through the microporous layer in the thickness direction with respect to the area of the gas diffusion electrode, the microporous layer side of the gas diffusion electrode was observed under an optical microscope, and the conductive porous substrate side was irradiated with light so that the regions passing through the microporous layer in the thickness direction were made to shine and be photographed as an image. Then, the number of the white regions regarded as the regions passing through the microporous layer in the thickness direction was divided by the area of the field of view (unit: $mm^2$) to determine the number of regions passing through the microporous layer in the thickness direction with respect to the gas diffusion electrode.

D. Method of Measuring Carbon Intensity and Fluorine Intensity in Non-Penetration Portion The carbon intensity and fluorine intensity of the non-penetration portion were measured by carrying out element distribution analysis to a cross-section cut out parallel with the thickness direction using an ion milling apparatus. The element distribution analysis was carried out, for example, in such a way that an energy dispersive X-ray spectrometry (EDX) or an electron probe microanalyzer (EMPA) (EPMA-1610, made by Shimadzu Corporation) was used to detect characteristic X-rays reflected by irradiation of electron rays, and the characteristic X-rays reflected by irradiation of electron rays were quantitated to determine the carbon and fluorine in % by mass. The carbon and fluorine in % by mass were each defined as its intensity. Further, the carbon intensity and fluorine intensity were measured at 0.3 μm intervals in the thickness direction in each region, and the average of the detected values was determined.

E: Method of Measuring Density of Conductive Porous Substrate

The density of the conductive porous substrate was determined by weighing the mass of the conductive porous substrate using an electronic balance and dividing the obtained value by the thickness (a) of the conductive porous substrate determined in the section A.

F. Method of Measuring Water Permeation Pressure

Using the capillary flow porometer (CFP-1500AEXLC) manufactured by Porous Materials, Inc., water was dropped onto the microporous layer, pressurized air was applied from the microporous layer side toward the conductive porous substrate side, the pressurized air pressure was increased, and a pressurized air pressure at which air started flowing to the conductive porous substrate was measured, whereby the water permeation pressure (kPa) was measured.

G. Method of Measuring of Through-Plane Gas Diffusivity

Using a water vapor diffusion permeameter (MVDP-200C) manufactured by Seika Corporation, a gas mixture of oxygen gas and nitrogen gas to be measured for diffusivity was passed along one side of the gas diffusion electrode (primary side), while nitrogen gas was passed along the other side (secondary side). While the pressure difference between the primary side and the secondary side was controlled near 0 Pa (0±3 Pa) (that is, under conditions where there is hardly gas flow due to the pressure difference, and the gas migration phenomenon occurs only by molecular diffusion), the gas concentration in an equilibrium state was measured with an oxygen concentration meter in the secondary side. The obtained value (%) was used as an index of the through-plane gas diffusivity.

H. Method of Evaluating Power Generation Performance

The gas diffusion electrodes obtained were set to sandwich an integrated combination of an electrolyte membrane and a catalyst layer (a catalyst layer "PRIMEA" (registered trademark) made by W. L. Gore & Associates, Co., LTD. formed on both sides of an electrolyte membrane "GORE-SELECT" (registered trademark) made by W. L. Gore & Associates, Co., LTD.) from both sides such that the catalyst layer was in contact with the microporous layer, and the resulting set was hot-pressed to make a membrane electrode assembly (MEA). This membrane electrode assembly was incorporated in a single cell for a fuel cell, the cell temperature, fuel utilization ratio, and air utilization ratio were set to 40° C., 70%, and 40% respectively, the hydrogen at the anode side and the air at the cathode side were humidified to have a dew point of 75° C. and 60° C. respectively, and the cell was allowed to generate power. The current density was continuously raised, and a current density value at which power generation stopped (limited current density) was used as an index for flooding resistance. In addition, a similar measurement was made at a cell temperature of 90° C., and the value obtained was used as an index for an anti-dry-out characteristic. Furthermore, the power generation performance under normal operating conditions (at a cell temperature of 70° C.) was also measured.

Example 1

While a carbon paper wound in a roll form was conveyed using a wind-up conveyor, the carbon paper was dipped in a dipping tank filled with a water-repellent resin dispersion in which a fluorine resin was dispersed at a concentration of 2% by mass in water, to perform water-repellent treatment. The carbon paper was then dried with a dryer set at 100° C., and wound up by a wind-up machine, to obtain a water-repellent-treated conductive porous substrate. As the water-repellent resin dispersion, a dilution prepared by diluting an FEP dispersion ND-110 with water such that the FEP concentration became 2% by mass was used.

Subsequently, provided was a wind-up continuous coater with a conveyor having an unwinding machine, guide roll, back roll, inserting paper unwinding machine, and wind-up machine, and with a die coater, dryer, and sintering machine.

As the water-repellent-treated conductive porous substrate, an uncoated roll in which a 400-m sheet of carbon paper was wound in a roll form was placed in the unwinding machine.

The uncoated roll was conveyed using drive rolls arranged in the unwinding section, the wind-up section, and the coater sections. First, a microporous layer ink was applied using a die coater, water vapor was removed by drying with hot air at 100° C. using a dryer, and then sintering was carried out in a sintering machine set at a temperature of 350° C., followed by winding up by a wind-up machine.

In this regard, the microporous layer inks were prepared as follows.

Microporous Layer Ink:

A 15 parts by mass amount of carbon black, 9 parts by mass of a water-repellent resin (FEP dispersion, "Neoflon" (registered trademark) ND-110), 15 parts by mass of a surfactant ("TRITON" (registered trademark) X-100), and 61 parts by mass of purified water were kneaded using a planetary mixer to prepare an ink.

The application of the microporous layer ink was carried out such that the areal weight of the microporous layer after sintering was adjusted to 16 g/m$^2$.

In addition, the gas diffusion electrodes prepared as above-mentioned were attached to both sides of the electrolyte membrane having a catalyst layer on each side thereof by thermocompression such that the microporous layer was in contact with the catalyst layer, and the resulting assembly was incorporated in a single cell in a fuel cell, and evaluated for power generation performance (limited current density) at temperatures of 40° C., 70° C., and 90° C.

The measured properties are shown in Table 1.

Example 2

A gas diffusion electrode was obtained in the same manner as in Example 1 except that 15 parts by mass of carbon black, 13 parts by mass of a water-repellent resin (FEP dispersion, "Neoflon" (registered trademark) ND-110), 15 parts by mass of a surfactant ("TRITON" (registered trademark) X-100), and 57 parts by mass of purified water were kneaded using a planetary mixer to prepare an ink. The measured properties are shown in Table 1.

Example 3

A gas diffusion electrode was obtained in the same manner as in Example 1 except that 15 parts by mass of carbon black, 17 parts by mass of a water-repellent resin (FEP dispersion, "Neoflon" (registered trademark) ND-110), 15 parts by mass of a surfactant ("TRITON" (registered trademark) X-100), and 53 parts by mass of purified water were kneaded using a planetary mixer to prepare an ink. The measured properties are shown in Table 1.

Example 4

A gas diffusion electrode was obtained in the same manner as in Example 1 except that the conductive porous substrate had a density of 0.53 g/cm$^3$. The measured properties are shown in Table 1.

Comparative Example 1

A gas diffusion electrode was obtained in the same manner as in Example 1 except that 15 parts by mass of carbon black, 5 parts by mass of a water-repellent resin (FEP dispersion, "Neoflon" (registered trademark) ND-110), 15 parts by mass of a surfactant ("TRITON" (registered trademark) X-100), and 65 parts by mass of purified water were kneaded using a planetary mixer to prepare an ink. The measured properties are shown in Table 1.

TABLE 1

| | | Unit | Example 1 | Example 2 | Example 3 | Example 4 | Comparative Example 1 |
|---|---|---|---|---|---|---|---|
| Water-Repellent Resin Content in 100% by mass of Whole Conductive Porous Substrate | | mass % | 9 | 13 | 17 | 9 | 5 |
| Thickness of Penetration Portion | | μm | 15 | 12 | 10 | 13 | 22 |
| Thickness of Microporous Layer | | μm | 28 | 29 | 31 | 27 | 29 |
| Penetration Amount | | % | 54 | 41 | 32 | 48 | 76 |
| Area Ratio of Regions passing through Microporous Layer in the Thickness Direction | | % | 0.13 | 0.67 | 0.92 | 0.12 | 0.07 |
| Number of the Regions passing through Microporous Layer in the Thickness Direction per 1 mm$^2$ of Gas Diffusion Electrode | | pieces | 0.5 | 2.2 | 4.8 | 0.2 | 0.3 |
| (Assuming that Carbon Intensity is 100) Fluorine Intensity in Non-penetration Portion | | — | 17 | 15 | 14 | 14 | 22 |
| Density of Conductive Porous Substrate | | g/cm$^3$ | 0.25 | 0.25 | 0.25 | 0.53 | 0.25 |
| Water Permeation Pressure | | kPa | 22 | 10 | 9 | 28 | 37 |
| Gas Diffusion Electrode | Through-plane Gas Diffusivility | % | 31 | 30 | 30 | 31 | 31 |
| | Power Generation Performance (at Cell Temperature of 40° C.) | A/cm$^2$ | 1.74 | 1.76 | 1.78 | 1.72 | 1.70 |
| | Power Generation Performance (at Cell Temperatureof 70° C.) | A/cm$^2$ | 2.48 | 2.49 | 2.48 | 2.47 | 2.44 |
| | Power Generation Performance (at Cell Temperature of 90° C.) | A/cm$^2$ | 1.67 | 1.68 | 1.68 | 1.66 | 1.63 |

INDUSTRIAL APPLICABILITY

The gas diffusion electrode according to the present invention is suitably used as an electrode for fuel cells. Among fuel cells, the gas diffusion electrode is suitably used as an electrode for a polymer electrolyte fuel cell that is used particularly as a power supply for fuel cell vehicles and the like.

REFERENCE SIGNS LIST

1: microporous layer
2: carbon fibers
10: outermost surface of conductive porous substrate
11: point on outermost surface of microporous layer
12: outermost surface of microporous layer
13: point where the penetration portion is nearest the outermost surface of the conductive porous substrate
14: innermost face of microporous layer
15: point nearest the outermost surface of the microporous layer, in the outermost surface of microporous layer side of the conductive porous substrate
16: innermost face of conductive porous substrate
a: thickness of conductive porous substrate
b: thickness of penetration portion
c: thickness of microporous layer

The invention claimed is:

1. A gas diffusion electrode comprising:
a conductive porous substrate, and
a microporous layer on at least one side of said conductive porous substrate;
wherein the total of regions passing through said microporous layer in the thickness direction has an area ratio of 0.1% or more and 1% or less, and
wherein said microporous layer has a portion that has penetrated into said conductive porous substrate (hereinafter referred to as penetration portion), said penetration portion having a thickness ratio (hereinafter referred to as penetration amount) of 30% or more and 70% or less with respect to 100% of the thickness of said microporous layer, and said microporous layer comprises a non-penetration portion that is the portion other than the penetration portion, wherein said non-penetration portion has a fluorine intensity of 5 or more and 20 or less, assuming that said non-penetration portion has a carbon intensity of 100.

2. The gas diffusion electrode according to claim 1, wherein number of said regions passing through said microporous layer in the thickness direction is 0.4 or more and 7.0 or less per 1 $mm^2$ area of said gas diffusion electrode.

3. The gas diffusion electrode according to claim 1, wherein said conductive porous substrate has a density of 0.15 $g/cm^3$ or more and 0.5 $g/cm^3$ or less.

4. The gas diffusion electrode according to claim 1, wherein said microporous layer has a thickness of 100 μm or less.

5. A fuel cell comprising said gas diffusion electrode according to claim 1.

* * * * *